United States Patent [19]
Standish et al.

[11] Patent Number: 5,853,148
[45] Date of Patent: Dec. 29, 1998

[54] THRUST REVERSER WITH ADJUSTABLE SECTION NOZZLE FOR AIRCRAFT JET ENGINE

[75] Inventors: Robert R. Standish, Gazeran; Bernard Laboure, Velizy Villacoubly, both of France

[73] Assignee: Societe de Construction des Avions Hurel-Dubois, Meudon La Foret, France

[21] Appl. No.: 767,620

[22] Filed: Dec. 17, 1996

[30] Foreign Application Priority Data

Dec. 19, 1995 [FR] France .................................. 95 15030

[51] Int. Cl.$^6$ ....................................................... F02K 1/60
[52] U.S. Cl. .................................. 244/110 B; 239/265.29; 239/265.31; 60/226.2; 60/232
[58] Field of Search ............................. 244/110 B, 73 R, 244/74; 239/265.25, 265.27, 265.29, 265.31, 265.33, 265.37; 60/226.2, 232, 228, 209, 230

[56] References Cited

U.S. PATENT DOCUMENTS

| | | |
|---|---|---|
| 3,020,712 | 2/1962 | Dolliver . |
| 3,036,431 | 5/1962 | Vdolek . |
| 3,754,708 | 8/1973 | Britt et al. ........................ 239/265.29 |
| 3,797,785 | 3/1974 | Baerresen et al. . |
| 4,340,178 | 7/1982 | Lawson .............................. 239/265.31 |
| 4,485,970 | 12/1984 | Fournier et al. .................... 244/110 B |
| 4,807,434 | 2/1989 | Jurich ..................................... 60/226.2 |
| 5,228,641 | 7/1993 | Remlaoui ............................ 244/110 B |
| 5,313,788 | 5/1994 | Wright et al. ....................... 244/110 B |
| 5,575,147 | 11/1996 | Nikkanen ............................... 60/226.2 |

FOREIGN PATENT DOCUMENTS 0 043 764   1/1982   European Pat. Off. .

*Primary Examiner*—S. Joseph Morano
*Attorney, Agent, or Firm*—Young & Thompson

[57] ABSTRACT

The invention relates to a thrust reverser for a bypass jet engine that reverses the fan flow. The thrust reverser is installed in the fixed outer cowl and is comprised of pivoting doors that block the fan flow in order to create reverse thrust. A translating annular nozzle is located aft of the pivoting doors in the stowed position, preventing in flight inadvertent deployment. When the nozzle are translated aft, the doors are free to pivot and, at the same time, the section of the fan nozzle can be adjusted to produce more or less fan flow.

8 Claims, 5 Drawing Sheets

THRUST REVERSER WITH ADJUSTABLE SECTION NOZZLE FOR AIRCRAFT JET ENGINE

FIELD OF THE INVENTION

The present invention relates to a thrust reverser for a bypass jet engine. More specifically, it relates to a thrust reverser of the pivoting door type shown in U.S. Pat. No. 4,485,970 (Fournier et al.).

BACKGROUND OF THE INVENTION

A reverser of this type is mounted in an outer cowling surrounding the engine structure and having the same longitudinal axis thereas, the cowling, defining with the engine structure an annular duct through which a stream of gas pushed by a fan can flow from an upstream region towards a downstream region of the cowling, the reverser consisting of pivoting doors arranged in openings (or pits) made in the cowling and defined, upstream and downstream, by upstream and downstream annular fixed parts of the cowling and, at the sides, by longitudinal beams integral with the cowling, the doors being articulated, in the fixed structure of the cowling, about pivots so that they can be moved, under the action of a command to pivot, between a stowed position in which the doors close off the openings in the cowling, and a deployed position in which the doors block the flow of the stream of gas flowing in the annular duct in order to deflect it outwards, to create reverse thrust.

The present invention sets out to improve the reverser described hereinabove by increasing its operating safety while at the same time improving the performance of the jet engine.

Indeed it is known that safety requirements as far as jet aircraft are concerned are becoming increasingly strict. In particular, for reversers with doors, the demand is for very effective measures to be put in place to avoid any inadvertent deployment of the reverser doors during flight, while maintaining optimum engine performance. In order to meet these requirements it has been necessary to provide, in addition to the locking of the actuators which command the pivoting of the doors, a series of auxiliary locks which lead to structural complications and to an increase in weight which goes contrary to maintaining engine performance.

The invention proposes a simple and particularly effective system for complying with the conditions recalled above.

SUMMARY OF THE INVENTION

The present invention comprises a thrust reverser that is characterized by a translating annular nozzle, capable of sliding longitudinally, parallel to the axis X–X' of the engine, between an upstream position and a downstream position, housed inside the downstream annular fixed part of the cowling, the upstream end of the nozzle having an immobilizing means which, when the nozzle is in the upstream position, can immobilize the pivoting doors in the stowed position, thus preventing any inadvertent deployment of the doors and which, when the nozzle is in the translated downstream position, ceases to immobilize the doors, thus allowing them to be pivoted from their stowed position to their deployed position.

It is thus possible to prevent the doors from opening in the stowed position, this prevention being all the more effective as the nozzle interacts with the rear part of the doors, that is to say in a region distant from the door pivots.

Advantageously, the translating nozzle is mounted so that it can slide in rails which are diametrically opposed with respect to the axis X–X' of the engine, these rails being integral with the fixed structure of the cowling. In addition, the nozzle is made to slide by a command means independent of the pivot command for the pivoting doors.

According to a preferred embodiment, the immobilizing means with which the nozzle is equipped consists of part of the nozzle which interacts with part of the pivoting doors, it being possible for this immobilizing means to be an upstream annular skirt of the nozzle intended to be fitted inside a cavity made in the downstream end of the pivoting doors, the length of that part of the skirt which interacts with the cavity being shorter than the downstream transitional travel of the nozzle, so as to allow the doors to be completely freed when the nozzle reaches the end of its travel.

An additional advantage offered by the reverser according to the invention lies in the fact that the translating nozzle constitutes a nozzle with variable exhaust section. To this end, the internal surface of the translating nozzle is conical from the upstream to the downstream end, the narrowest section being situated at its downstream end. In this way, when the nozzle is in the translated downstream position, the exhaust section thereof, measured between the downstream end of the nozzle and the external wall of the engine structure, is greater than the exhaust section of the nozzle when it is in the upstream position.

It will be noted that, as the movement of the nozzle is commanded independently, it can be placed in any desired intermediate position between its two extreme positions. In this way it is possible to influence the flow rate of the stream of gas.

BRIEF DESCRIPTION OF THE DRAWINGS

One embodiment of the invention will now be described by way of non-limiting example, with reference to the appended drawings in which.

DETAILED DESCRIPTION OF THE INVENTION

Figure 1:
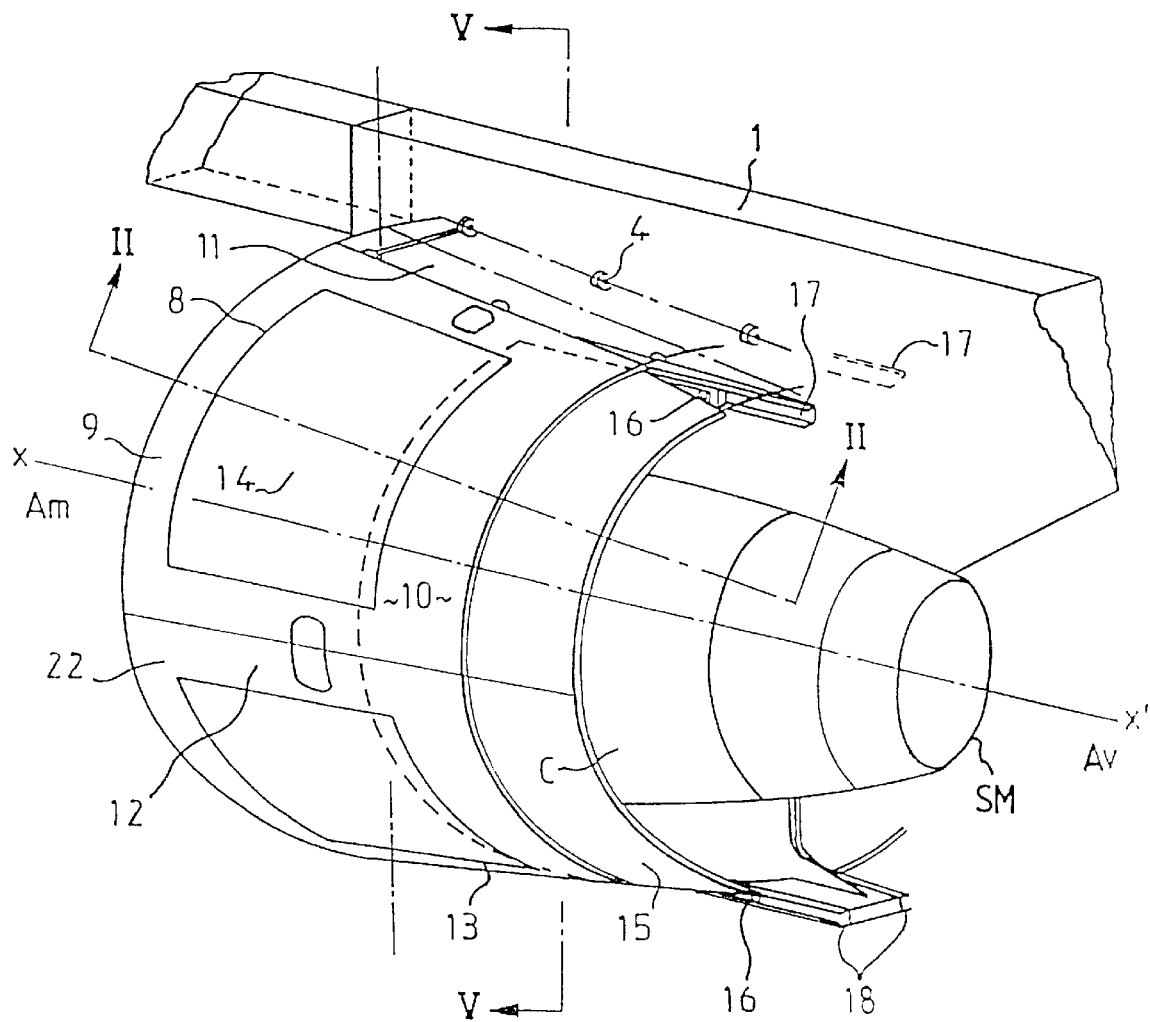
FIG. 1 is a perspective view of the rear part of a jet engine quipped with a thrust reverser according to the invention, in which the variable section nozzle is in the fully translated upstream position.

In the embodiment represented in the drawings, reference is made to a jet engine mounted under a wing, but it will be understood that the invention is just as applicable to engines mounted in side nacelles on the fuselage. Likewise, the door-type reverser represented by way of illustration has four pivoting doors, but the invention also relates to reversers having a different number of doors, for example having two or three doors.

Figure 4:
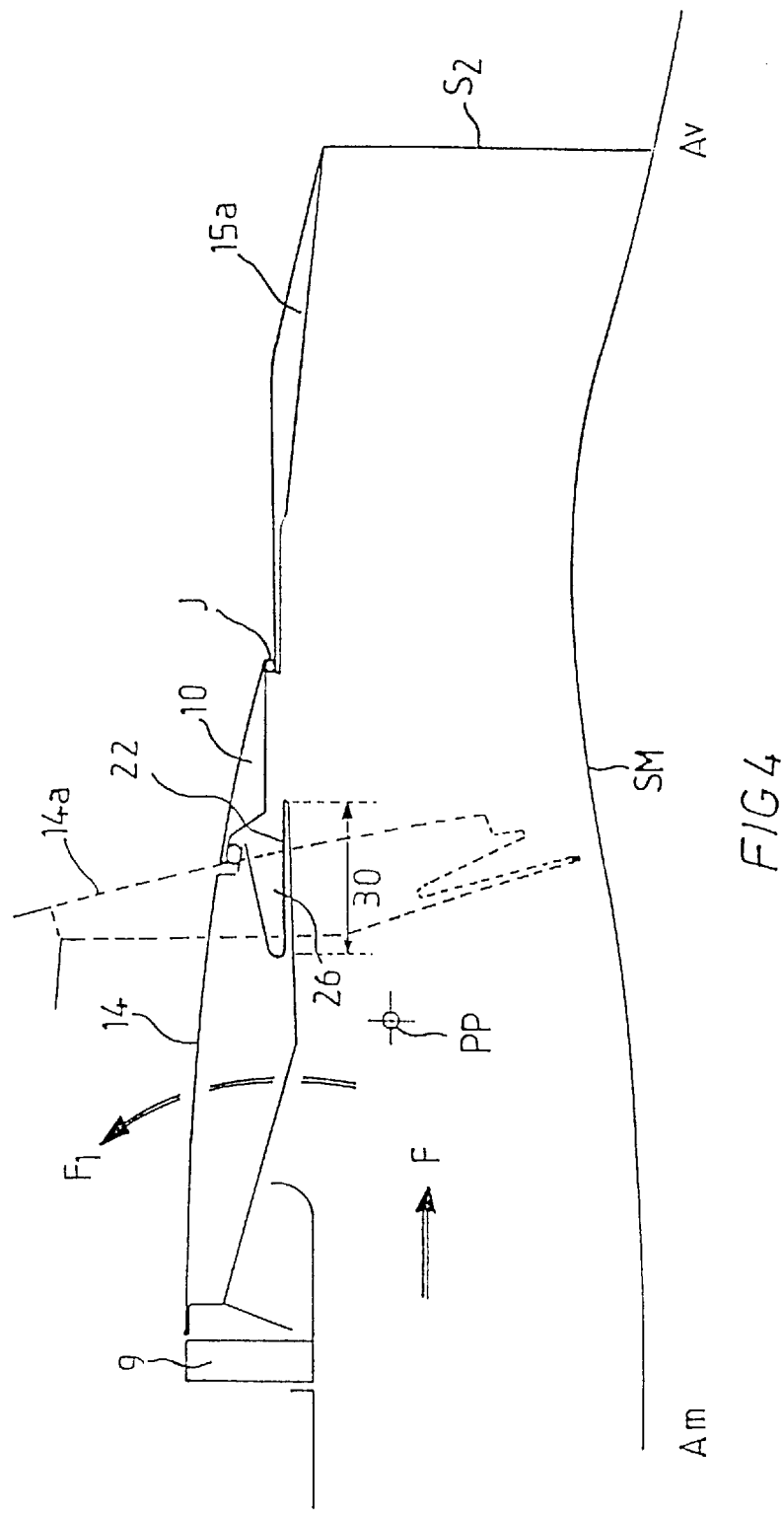
FIG. 4 is a diagrammatic and partial section on the line IV—IV of FIG. 3, showing also, in broken line, a reverser door in the deployed position.
Figure 5:
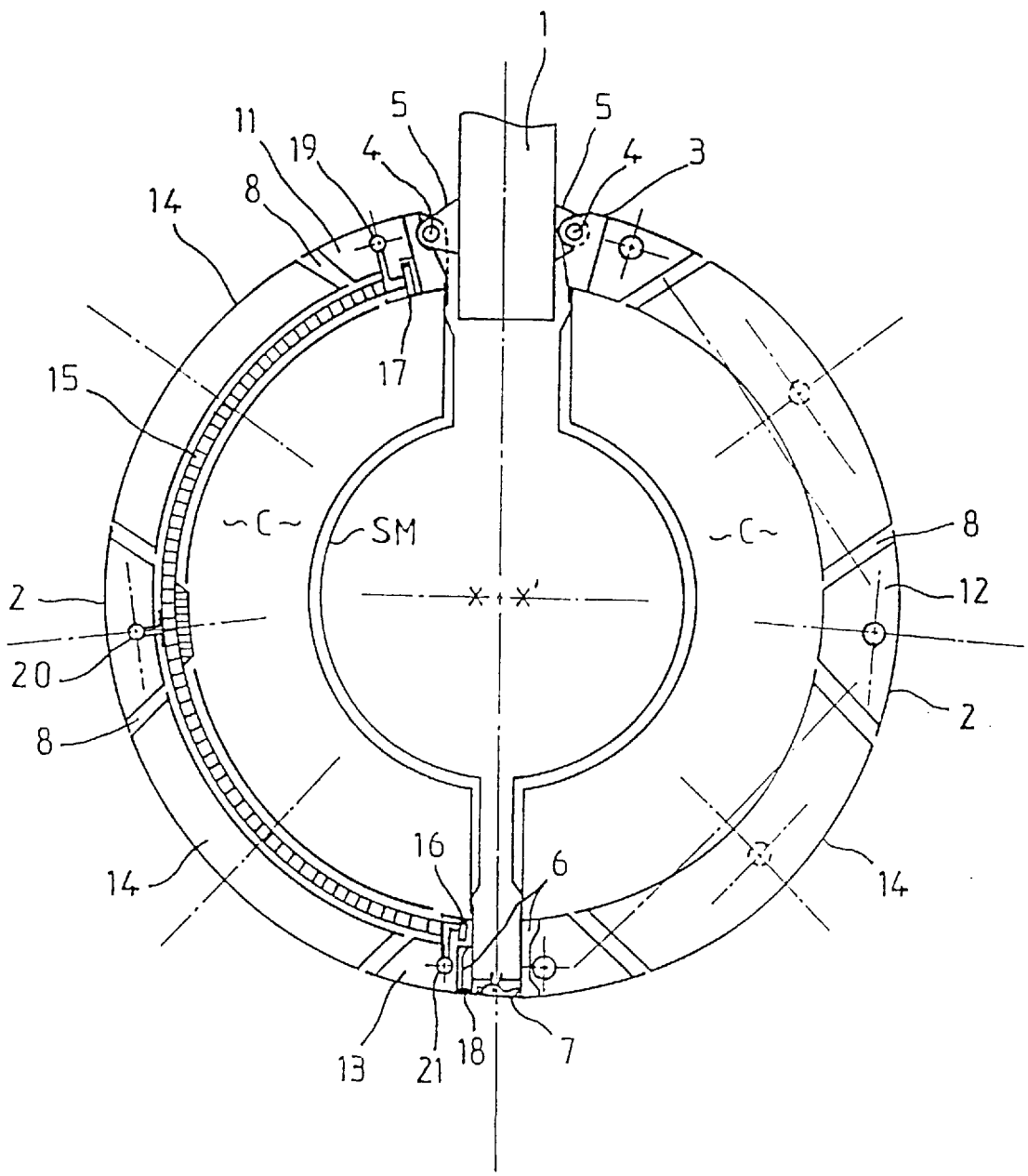
FIG. 5 is a transverse half-section made on the line V—V of FIG. 1.

As is well known, an engine mounted under the wing is supported, as represented in FIGS. 1 and 5 in particular, by a longitudinal pylon 1 to which the outer cowling, denoted in general as 2, is fixed in a clevis 5 (FIG. 5). This cowling which is substantially concentric with the longitudinal axis X–X' of the engine (not represented) consists of two half-shells which are symmetric with respect to the vertical plane of the engine and are articulated at 4 in the devises 5 of the pylon, so that they can be opened to give access to the rotating parts of the engine for servicing. An upper longitudinal fitting 3 and a lower longitudinal fitting 6 provide the half-shells with rigidity while at the same time on the one hand allowing them to be fastened to the pylon 1 and, on the other hand, allowing their lower end to be locked using a system of hooks 7. In addition, the two symmetric parts of the casing SM of the engine unit are fixed to the fittings 3 and 6 and are thus secured to the shells of the cowling 2. Formed between the casing SM and the internal wall of the cowling 2 is an annular duct C allowing a stream of bypass gases pushed by a fan situated at the front end of the engine and not represented to flow from the upstream towards the downstream end of the engine. This flow takes place in the direction of the arrow F in the cruise position and in the direction of the arrow $F_1$ in the thrust-reversal position (FIGS. 2 and 4).

Figure 2:
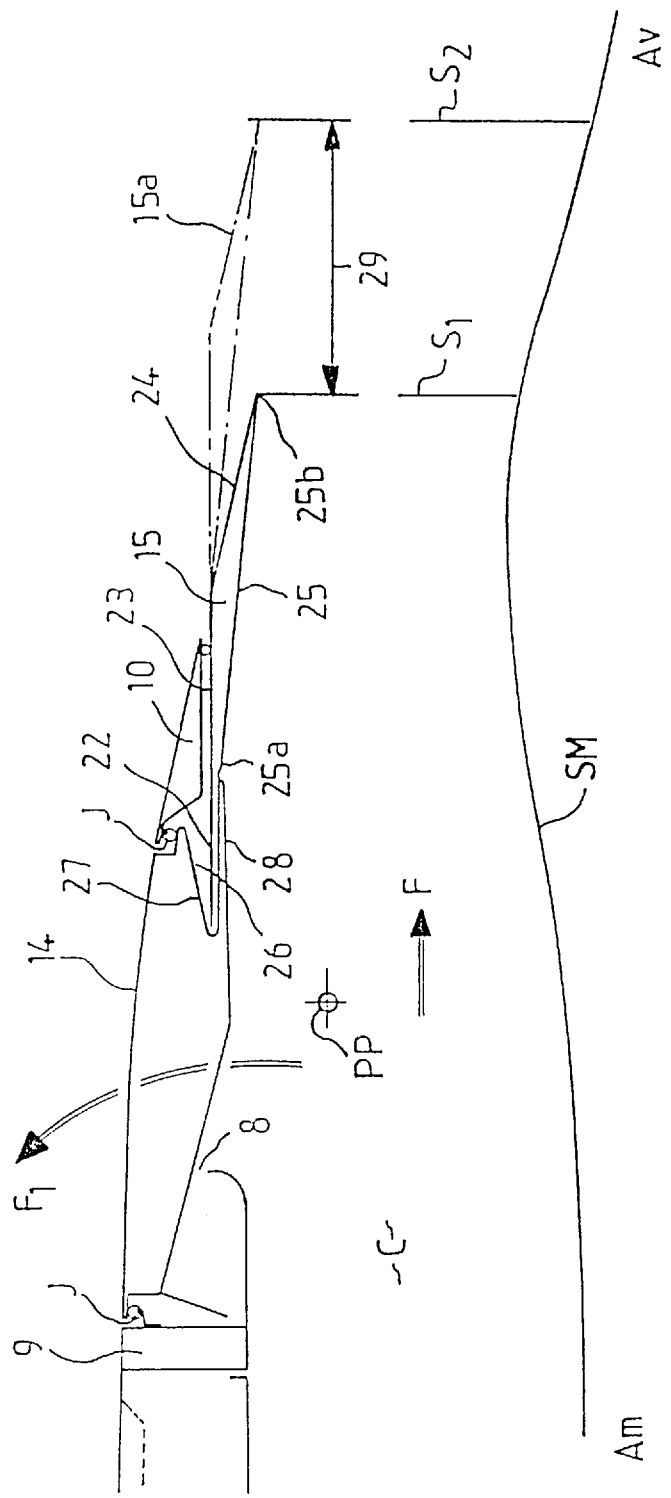
FIG. 2 is a diagrammatic and partial section on the line II—II of FIG. 1.
Figure 3:
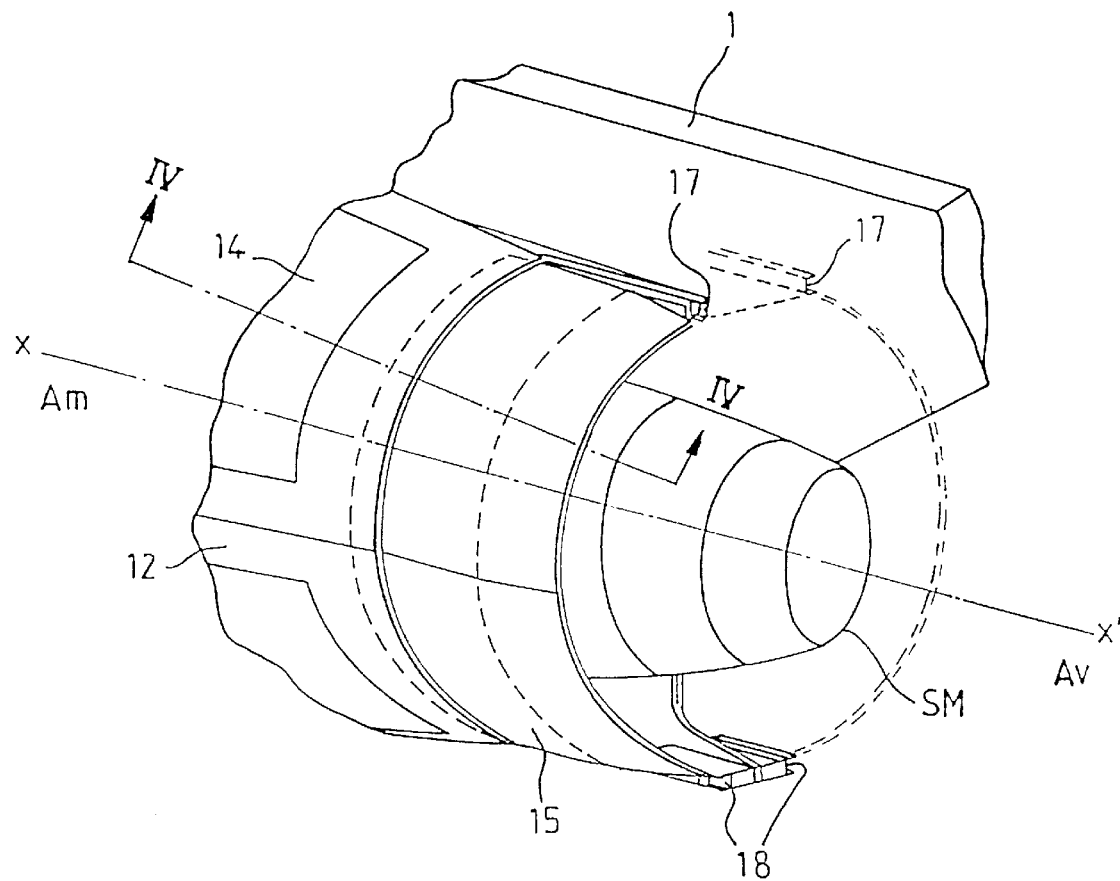
FIG. 3 is a perspective view similar to FIG. 1 but representing the variable section nozzle in the fully translated downstream position.

As shown in FIG. 2, the cowling 2 has openings 8 or pits, these openings being defined, upstream Am and downstream Av, by continuous annular ring structures 9 and 10 and, laterally, by longitudinal beams 11, 12 and 13. Housed in these openings 8 are the reverser doors 14 which are articulated between the longitudinal booms about pivots PP (see FIGS. 2 and 4). The doors are thus capable of being pivoted between the stowed position represented in solid line in FIGS. 1 and 4 and the deployed position represented in broken line as 14a in FIG. 4.

As may be seen particularly in FIG. 5, housed inside the half-shells which make up the cowling 2 are two symmetrical semi-tubular elements which together form a nozzle 15. Each nozzle element is mounted via its ends fitted with rollers 16, in such a way as to be able to slide longitudinally and parallel to the axis X–X', in upper 17 and lower 18 rails which are integral with the fittings 3 and 6. The translational movement of the nozzle is achieved by actuators 19, 20 and 21 housed in the fixed parts 11, 12 and 13 of the cowling.

In longitudinal section, as represented in FIG. 2, the nozzle 15 has a substantially cylindrical upstream external surface 23 extended downstream by a surface 24 which converges towards the axis of the engine, this arrangement ensuring aerodynamic continuity with the exterior surface of the cowling when the nozzle is in the upstream position (as in FIG. 2). The interior wall of the nozzle from the downstream towards the upstream end has a conical surface 25 extended, at the point 25a, by a shoulder delimiting a surface set back parallel to the external surface 23 and constituting therewith a cylindrical skirt 22. It will be noted that the point 25a is advantageously further from the engine axis X–X' than the point 25b situated at the end of the nozzle, this nozzle consequently being a converging nozzle.

The skirt 22 of the nozzle is intended to interact, in the cruise position represented in FIG. 2, with the rear part of the pivoting doors 14 which have a cavity 26 defined by an inclined upper surface 27 and by a lower tab 28, the skirt 22 fitting between the face 27 and the tab 28 so as to immobilize the doors in the stowed position.

It will be noted that the travel 29 for the translational movement of the nozzle 15 between its two extreme positions represented respectively in solid line and in broken line, 15a, in FIG. 2, is longer than the length 30 (FIG. 4) of the skirt 22 and of the cavity 26, in such a way that when the nozzle is in the position in which it is translated downstream as far as it will go, this position being represented more clearly in FIG. 4, the doors can be opened into the deployed position without being impeded in any way.

It will be understood that by acting on the actuators 19, 20, 21 commanding the sliding of the nozzle, it is possible to set the position thereof as desired and to place it in any intermediate position between its extreme positions. It may also adopt the usual function of a variable exhaust section nozzle. This is all the more true as the shape of the casing SM of the engine structure has, as can be seen in FIGS. 2 and 4, in particular, a converging profile. It is thus observed that the exhaust section S2 of the nozzle in the translated downstream position is greater than the exhaust section S1 corresponding to the upstream position. An improvement in engine performance is thus obtained.

Seals have been represented as J in FIGS. 2 and 4.

What we claim is:

1. Thrust reverser for a bypass aircraft jet engine, mounted in an outer cowling surrounding an engine structure and having the same longitudinal axis thereas, said cowling defining with the engine structure an annular duct through which a stream of gas pushed by a fan can flow from an upstream region towards a downstream region of the cowling, said reverser consisting of pivoting doors arranged in openings made in said cowling and defined, upstream and downstream, by upstream and downstream annular fixed parts of the cowling and, laterally, by longitudinal beams integral with the cowling, said doors being articulated, in a fixed structure consisting of the fixed parts of the cowling, about pivots so that they can be moved, under the action of a command to pivot, between a stowed position in which the doors close off the openings in the cowling, and a deployed position in which the doors block the flow of the stream of gas flowing in the annular duct in order to deflect it outwards to create reverse thrust, wherein a translating annular nozzle, capable of sliding longitudinally, parallel to the axis of the engine, between an upstream position and a downstream position, is housed inside the downstream annular fixed part of the cowling, an upstream end of the nozzle having an immobilizing means which, when the nozzle is in the upstream position, can immobilize the pivoting doors in the stowed position, thus preventing any inadvertent deployment of the doors and which, when the nozzle is in the downstream position, ceases to immobilize the doors, thus allowing them to be pivoted from their stowed position to their deployed position.

2. Thrust reverser according to claim 1, wherein the translating nozzle is mounted so that it can slide in rails which are diametrically opposed with respect to the axis of the engine, these rails being integral with the fixed structure of the cowling.

3. Thrust reverser according to claim 1, wherein the nozzle is made to slide by a command means independent of the pivot command for the pivoting doors.

4. Thrust reverser according to claim 1, wherein the immobilizing means consists of a part of the nozzle which interacts with a part of the pivoting doors.

5. Thrust reverser according to claim 1, wherein the immobilizing means consists of an annular skirt having a part intended to fit inside a cavity made inside the downstream end of the pivoting doors, the length of that part of the skirt which interacts with the cavity being shorter than the longitudinal sliding of the translating nozzle to the downstream position.

6. Thrust reverser according to claim 1, wherein the translating nozzle constitutes a nozzle of variable exhaust section.

7. Thrust reverser according to claim 1, wherein the translating nozzle has an internal surface which is conical from the upstream towards the downstream end, with a narrowest section situated at its downstream end.

8. Thrust reverser according to claim 1, wherein, the translating nozzle has an exhaust section, measured between the downstream end of the nozzle and an external wall of the engine structure, which is greater when the nozzle is in the downstream position than the exhaust section of the nozzle when in the upstream position.

* * * * *